US012540910B2

United States Patent
Wellmann et al.

(10) Patent No.: US 12,540,910 B2
(45) Date of Patent: Feb. 3, 2026

(54) DEVICE AND METHOD FOR MEASURING THE CURING PROCESS OF A CURABLE MATERIAL BY MEANS OF DIELECTRIC SPECTROSCOPY

(71) Applicant: IGB-TECH GMBH, Friedelsheim (DE)

(72) Inventors: Stefanie Wellmann, Friedelsheim (DE);
Rafael Gutowski, Friedelsheim (DE);
Andreas Doeker, Fuerstenfeldbruck (DE)

(73) Assignee: IGB-TECH GMBH, Friedelsheim (DE)

( * ) Notice: Subject to any disclaimer, the term of this patent is extended or adjusted under 35 U.S.C. 154(b) by 300 days.

(21) Appl. No.: 18/263,986

(22) PCT Filed: Feb. 3, 2021

(86) PCT No.: PCT/EP2021/052527
§ 371 (c)(1),
(2) Date: Aug. 2, 2023

(87) PCT Pub. No.: WO2022/167066
PCT Pub. Date: Aug. 11, 2022

(65) Prior Publication Data
US 2024/0094155 A1    Mar. 21, 2024

(51) Int. Cl.
*G01N 27/22*     (2006.01)
*B29C 35/02*     (2006.01)
(Continued)

(52) U.S. Cl.
CPC ....... *G01N 27/221* (2013.01); *B29C 35/0288* (2013.01); *G01N 27/026* (2013.01);
(Continued)

(58) Field of Classification Search
CPC .. G01N 27/221; G01N 27/026; G01N 27/227; G01N 33/442; B29C 35/0288; B29C 2035/0827
See application file for complete search history.

(56) References Cited

U.S. PATENT DOCUMENTS 5,635,845 A     6/1997 Strong et al.
5,872,447 A *   2/1999 Hager, III ............... G01N 22/00
                                                    324/637

(Continued)

FOREIGN PATENT DOCUMENTS

DE        10104854 A1    8/2005
DE     102014213969 A1    1/2016

OTHER PUBLICATIONS

PCT International Search Report and Written Opinion completed by the ISA/EP on Oct. 7, 2021 and issued in connection with PCT/EP2021/052527, 15 pages.

(Continued)

*Primary Examiner* — Feba Pothen
(74) *Attorney, Agent, or Firm* — Barnes & Thornburg LLP

(57) ABSTRACT

A device for measuring a curing process of a curable material by dielectric spectroscopy may include a transmission unit having a sensor configured to inject a signal in the form of an alternating electric field with a predetermined frequency into a sample of the curable material, and a receiving unit including an analysis device configured to detect changes in the predetermined frequency that occur in the course of a measurement process, wherein the analysis device is configured to determine, on the basis of frequency changes detected during the measurement process, a first state corresponding an uncured state of the sample applied to the sensor, a second state corresponding to a completed application of the uncured sample to the sensor, and a third (Continued)

Figure 1:
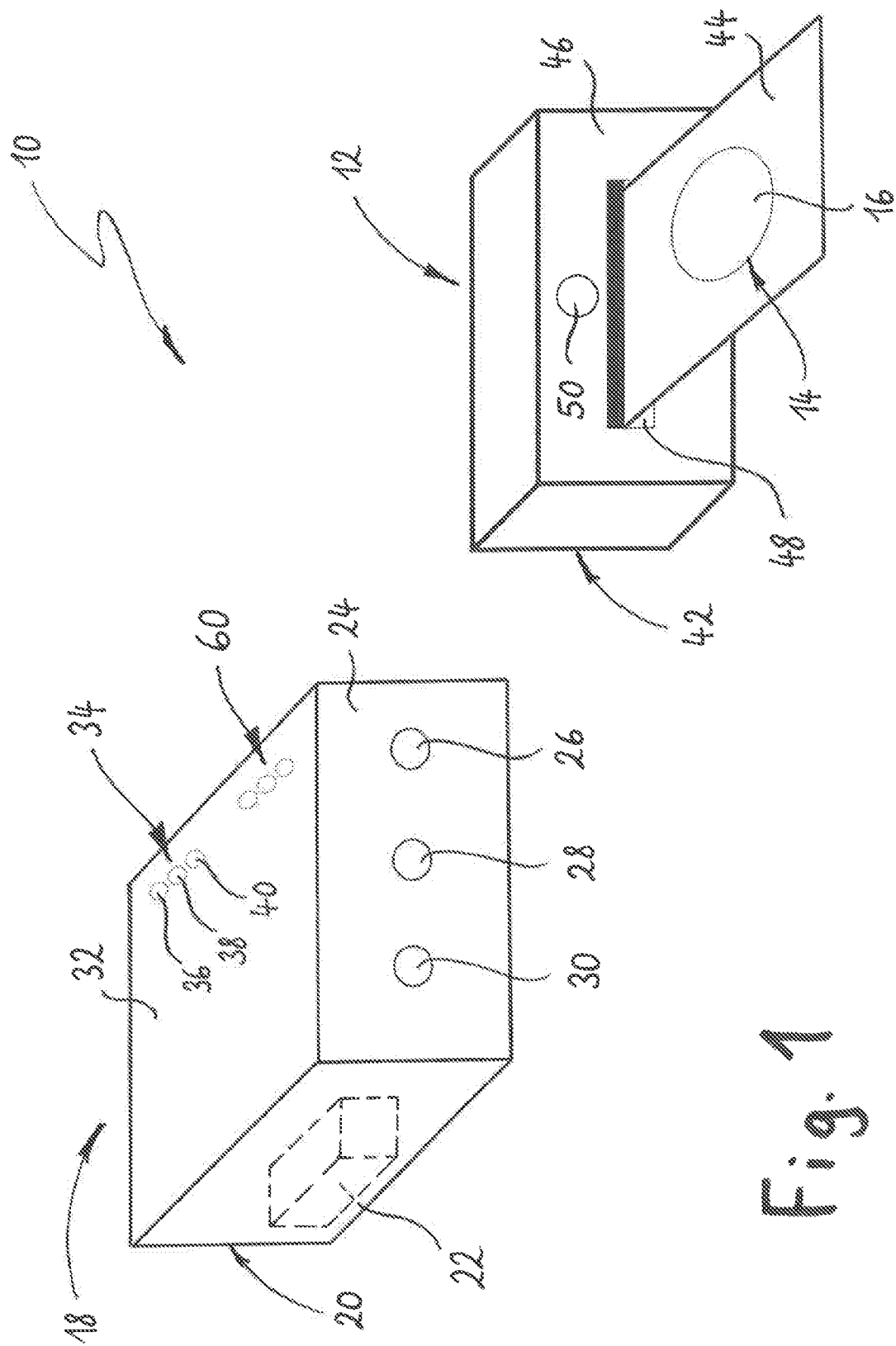

state corresponding to a desired curing state of the curable material being reached, wherein the receiving unit has a display device for displaying the three states.

15 Claims, 4 Drawing Sheets

(51) Int. Cl.
  *G01N 27/02* (2006.01)
  *G01N 33/44* (2006.01)
  *B29C 35/08* (2006.01)

(52) U.S. Cl.
  CPC .... *G01N 27/227* (2013.01); *B29C 2035/0827* (2013.01); *G01N 33/442* (2013.01)

(56) References Cited

U.S. PATENT DOCUMENTS

| | | | |
|---|---|---|---|
| 7,120,342 B2 | 10/2006 | Chang et al. | |
| 2002/0135385 A1* | 9/2002 | Magill | G01N 27/226 324/663 |

OTHER PUBLICATIONS

International Preliminary Report on Patentability completed on Nov. 18, 2022 and issued in connection with PCT/EP2021/052527, 14 pages.

German Office Action issued on Sep. 16, 2020 in connection with German Patent Appln. No. 102020103154.8, 14 pages.

Arms, S.W.; Townsend, C.P.; Hamel, M.J.: Validation of Remotely Powered and Interrogated Sensing Networks for Composite Cure Monitoring. MicroStrain Inc., 2015. URL: https://www.microstrair].com/applications/validation-remotely-powered-and•interrogated-sensing-networks-composite-cure-monitoring [abgerufen am Nov. 9, 2020].

Freisleben Jarosla Vet al. "Monitoring device of resin curing process" 2016 39th International Spring Seminar On Electronics Technology (ISSE), IEEE, May 18, 2016 (May 18, 2016), pp. 452-455.

Polansky R et al. "Development of a measuring system for on-line in situ monitoring of composite materials manufacturing" Composites Part A: Applied Science and Manufacturing, Elsevier, Amsterdam, NL, vol. 90, Sep. 6, 2016 (Sep. 6, 2016), pp. 760-770.

Tomas Blecha et al. "Epoxy resin curing process evaluation based on signal frequency analysis from interdigital structure sensor" Electronic System-Integration Technology Conference (ESTC), 2010 3rd, IEEE, Piscataway, NJ, USA, Sep. 13, 2010 (Sep. 13, 2010), pp. 1-4.

Veigt, Marius [et al]: Curing Transponder—Integrating RFID transponder into glass fiber-reinforced composites to monitor the curing of the component. In: Procedia tylanufacturing, vol. 24, 2018, pp. 94-99.

Xu, Kun; Zhou, Shuxue; Wu, Umin: On-line and in-real-time monitoring of UV photopolymerization of nanocomposites with microdielectrometry. In: Progress in Organic Coatings, vol. 65, 2009, Issue 2, pp. 237-245.

Zahouily, K. [et al]: Cure Monitoring of UV-Curable Free Radical And Cationic Systems by Using In-situ Dielectric Analysis and Real-Time FT-Infrared Spectroscopy. 2004.

* cited by examiner

DEVICE AND METHOD FOR MEASURING THE CURING PROCESS OF A CURABLE MATERIAL BY MEANS OF DIELECTRIC SPECTROSCOPY

CROSS-REFERENCE TO RELATED APPLICATION

This application is a U.S. national stage entry of PCT Application No. PCT/EP2021/052527, filed Feb. 3, 2021.

The present invention relates to a device and a method for measuring the curing process of a curable material by means of dielectric spectroscopy.

Curable materials are used nowadays in many technical fields. Curable materials can serve, for example, as adhesives, finishes, casting compounds, surface coatings and similar. As the term "curable materials" already indicates, such materials are flowable or at least paste-like in their initial state, in order to easily be applicable at the envisaged point of use in a desired quantity. Only following the initiation of a curing reaction does a curing process commence, which can proceed extremely fast (e.g., in the order of milliseconds) or can also take much longer, for example several hours, depending on the material composition used. In each case, a desired curing state is to be reached at the end to guarantee the properties that the cured material is intended to have.

The chemical basis of curable materials is manifold. Curable materials can be organic materials, inorganic materials and mixtures of organic and inorganic materials. For example, radically curing acrylates, unsaturated polyesters, polyurethanes, epoxy resins or also reactants containing silane are often used. Curable materials can consist of a single curable component or a combination of several components, of which one or more are curable. The curing reaction can be triggered chemically, e.g., by bringing together and mixing two components, or also by supplying energy, for example by heating and/or irradiation with energy-rich light, in particular UV light. Storage-stable containers of curable materials usually consist of low-molecular components such as monomers, initiators, oligomers, stabilizers, fillers and other additives if applicable. Only following initiation of the curing reaction does a desired material mixture cure due to for example polymerization, wherein the degree of curing depends not only on the material mixture itself but also on which conditions are used to initiate the curing reaction and for how long these conditions are maintained.

One special embodiment, already briefly addressed previously, of curable materials are materials for which the curing reaction is initiated by irradiation with UV light and which then cure extremely quickly to form a polymer. On account of the very rapid curing reaction, such materials are readily used in manufacturing processes that have a high degree of automation. Examples of highly automated manufacturing processes of this kind are coating processes in for example automotive or furniture construction, the application of protective coatings, casting applications and bonding applications in the field of electronics and electrical engineering as well as medical technology, optics or mechanical engineering. Other application fields for in particular radiation-curable materials are the marking and labelling of packaging, for instance in the food or pharmaceutical industry.

Regardless of the type of curable material, it is important above all when using such curable materials industrially to have control of the result obtained following the curing process. In the curing of materials, it is usually important and desirable to achieve complete curing. Although it is self-evident that in the context of industrial process design, the relevant parameters are first defined and coordinated to one another, in particular by selecting a suitable curable material and the conditions required for initiating and maintaining the curing reaction (e.g. temperature and extent of a heat supply, wavelength and intensity of irradiation, etc.), it is still not guaranteed thereby that the result achieved in the daily industrial routine always corresponds to the desired outcome. For example, deviations from the specified material composition, a gradual change in the initiation conditions of the curing reaction and/or changes in the condition of components coming into contact with a curable material can have the consequence that the outcome of a curing process of a curable material that is being used changes in an undesirable manner. It is therefore desirable to be able to determine the progression and in particular the result of a curing reaction of a curable material as simply, quickly and "in situ" as possible, in order to be able to take suitable countermeasures as quickly as possible in the event of a divergence from the desired result.

It has already been known in principle for a long time to examine the curing process of a curable material by dielectric analysis. Such dielectric analysis is also termed dielectric spectroscopy and is based on measuring the interaction of an alternating electromagnetic field with the dipole moments and ions in the curable material to be examined. It can be generally said that in the liquid state or at any rate uncured state of a curable material, the dipoles in the material have higher mobility and oscillate more when an alternating electric field is applied, whereas in a solid, more or less cured state, the mobility and oscillation readiness of the dipoles is much lower. Devices for the dielectric analysis of the curing behavior of polymers, for example, are commercially available from the company Netzsch Gerätebau GmbH, for instance.

A characteristic of devices hitherto available for dielectric analysis consists in that such devices are based on a complex electrical analysis, which includes measurement of the phase shift and breakdown into what is termed a storage and loss modulus. They are therefore preferably suitable for stationary measurements in the laboratory, for fixedly installed measurement in casting or press molds or as wired sensors in laboratory or production facilities.

Other analysis devices, on the other hand, require a sample of a curable material used in the context of a manufacturing process, for example, to be brought from the production area into a laboratory in which the device for analysis is located and necessitate analysis of the sample and evaluation of the data obtained as part of the analysis there. The desire therefore exists for a device and a method with which it is possible in an economical, simple and rapid manner to be able to monitor the process and in particular the outcome of a curing reaction of a curable material locally where possible, i.e., at the point of use of the curable material, directly and preferably in real time.

The aforesaid object is achieved according to the invention by a device with the features indicated in Claim 1 and a method with the steps indicated in Claim 10.

A device according to the invention for measuring the curing process of a curable material by means of dielectric spectroscopy thus comprises:
  a mobile transmission unit with a sensor for coming into contact with a sample of the curable material, wherein the sensor is configured to inject a signal in the form of an alternating electric field with a predetermined frequency into the sample, and a receiving unit, physically separate from the transmission unit, which can communicate wirelessly with the transmission unit and contains an analysis device, which detects changes in the predetermined frequency occurring in the course of a measurement process. According to the invention, the sensor of the transmission unit is formed on a sensor circuit board that is connectable detachably to the transmission unit and the analysis device of the receiving unit is designed to determine, on the basis of frequency changes detected during a measurement process, at least three states:

a first state of decreasing frequency, which corresponds to application of the sample of uncured material to the sensor, a second state of a substantially constant first frequency, which corresponds to a completed application of the sample of uncured material to the sensor, and a third state of a substantially constant second frequency, which corresponds to a desired curing state of the curable material being reached, wherein the constant second frequency is higher than the constant first frequency. According to the invention, the receiving unit is furthermore provided with a display device for displaying the at least three states.

The inventive device has a number of advantages. On account of the transmission unit being physically separate from the receiving unit, the transmission unit can be designed to be small and compact, thus permitting its use in the immediate vicinity of a point of use of a curable material to be examined. The arrangement of the sensor on a sensor circuit board that can be connected detachably to the transmission unit permits an entire series of measurements to be undertaken consecutively in a fast and economical way in that for each measurement respectively, only one new sensor circuit board is connected to the transmission unit, for example by plugging the sensor circuit board into the transmission unit. Moreover, a configuration of this kind enables very slow curing reactions to be measured easily, because a sensor circuit board with a sensor to which a sample material has been applied can be detached from the transmission unit after an initial curing process and reconnected to the transmission unit at a later point in time (days, weeks, months or even years later) to continue the measurement. In this way changes in the sample material which can take place in the course of time due to ageing processes, for example, can also be detected. Furthermore, the sensor can be implemented as a disposable sensor without thereby significantly increasing the costs per measurement, because circuit boards of said type can be manufactured very cheaply in large quantities. Alternatively, the sensor can be reusable. Another advantage of the device according to the invention consists in the fact that no complicated evaluation of the measurement is required, but only the frequency changes that occur during a measurement starting out from the signal injected at a predetermined frequency into the sample are evaluated. The at least three states are determined solely from these frequency changes and displayed by the display device of the receiving unit, which three states inform a user of the device that a) application of a sample of the uncured material to the sensor has commenced, b) application of the sample to the sensor has been completed and c) a desired curing state of the curable material has been reached. In conclusion, the device according to the invention thus permits simple, fast, precise and yet economical measurement of the curing process of a curable material and informs a user of the device virtually in real time of the respective state of a measurement and its result.

According to a preferred configuration of the inventive device, the sensor is part of a resonant circuit containing a capacitor, the frequency change of which circuit is detected during the measurement process. In particular, the sensor can be part of a freely oscillating oscillator circuit and can, if the sensor itself is designed as a capacitor, be the frequency-determining element of the freely oscillating oscillator circuit. The metrological detection of such a resonant circuit can be undertaken by means of an ultra-fast comparator circuit and has been known for a long time, which is why a more detailed explanation is omitted here. Cost-efficient and mature solutions are available on the market for this. Alternatively, a circuit variant of a resonant circuit excited by a fixed frequency can be used for metrological detection of the curing process of the curable material to be examined. In this case the deviation of the resonant frequency occurring in the measurement resonant circuit from the predetermined reference frequency is measured.

In the device according to the invention, the sensor surface is the surface that must come into contact with the curable material to measure the curing process. To measure the curing process, a sample of the curable material to be examined is applied to the sensor surface and then the curing process is initiated. Before commencing a measurement, the sensor surface is empty and a predetermined frequency present at the sensor remains at least substantially constant. When the sample of curable material is applied to the sensor surface, the dielectric constant increases on account of the liquid now located on the sensor surface, which leads to an increase in the capacitance of the capacitor contained in the resonant circuit and thus to a reduction in the frequency of the resonant circuit. This frequency change is detected by the inventive device.

After the sample material has been fully applied to the sensor, the dielectric constant and thus also the capacitance of the capacitor contained in the resonant circuit rises no further, so that the frequency of the resonant circuit stabilizes at a substantially constant, first frequency.

As soon as the curing process has been initiated, due to the increasing curing of the sample material, the mobility of the dipoles contained in it decreases, which is synonymous with a reduction in the dielectric constant, the consequence of which is thus a decreasing capacitance of the capacitor contained in the resonant circuit and thus an increase in the frequency of the resonant circuit. This frequency change is also detected by the device according to the invention.

When the curing process approaches its end and the sample material has cured completely or at least almost completely, the dielectric constant and thus also the capacitance of the capacitor contained in the resonant circuit no longer falls any further, so that the frequency of the resonant circuit stabilizes at a substantially constant, second frequency, which is higher than the first frequency.

According to a particularly preferable embodiment of the device according to the invention, the sensor is designed as a capacitor and can be the capacitor of the resonant circuit, the frequency change of which is detected during the measurement process. If the sensor is designed as a capacitor, the sensor preferably has two cooperating comb electrodes, which define its sensor surface. The cooperating comb electrodes can be formed particularly preferably here on an upper side of the sensor circuit board, for example by configuring the cooperating comb electrodes as conductors engaging in one another on the upper side of the sensor circuit board and together forming a rectangular, square or also round sensor surface.

The device according to the invention detects the frequency changes during a measurement process preferably in that the oscillation periods of the resonant circuit per unit of time are measured during predetermined time windows. In the context of the present invention, the term "oscillation periods" is understood to mean not only sinusoidal oscillations or oscillations of another shape, but also pulses, because instead of a predetermined oscillation frequency, a predetermined pulse frequency can be injected into the sample just as well to measure the curing process.

The size of said time windows, during which the oscillation periods per time unit are detected, can be freely selected but is dependent on the predetermined frequency injected into the sample. The predetermined frequency injected into the sample is dependent in turn on the sample material to be examined and a desired penetration depth of the alternating electric field into the sample material. According to one embodiment of the inventive device, the predetermined frequency is approximately 9 MHz and the time windows during which the oscillation periods per unit of time are detected each have a length in the range of approx. 50 to 150 milliseconds.

During the curing process, a potentially significant degree of heat arises on account of the condensation or polymerization processes taking place here. To be able to track the temperature of the sample material during the curing process, the inventive device is advantageously equipped with a temperature sensor. According to a preferred configuration, this temperature sensor is located on the sensor circuit board and is associated with the sensor, more precisely the sensor surface. The temperature sensor is arranged particularly preferably on a rear side of the sensor circuit board in a region that is occupied by the sensor surface on the upper side of sensor circuit board.

So that the transmission unit can communicate wirelessly with the receiving unit, the transmission unit needs an aerial. According to an advantageous configuration of the inventive device, this aerial is arranged on the sensor circuit board, for example in the form of an electrical conductor formed on the upper and/or rear side of the sensor circuit board.

As already explained, initiation of the curing process can take place by irradiation with light, in particular UV light. Advantageous configurations of the inventive device are therefore provided with a UV sensor to detect UV irradiation of the sample, wherein the UV sensor is preferably part of the transmission unit and is furthermore mounted such that it detects UV light that reaches the sensor on which the sample material is located. By means of such a UV sensor, the beginning and duration of UV irradiation can be detected precisely as additional information.

The display device of the inventive device is able to display the at least three determined states. The display device can be a monitor connected to the device, for example. In one advantageous configuration of the inventive device, the display device consists only of three LEDs, which can in particular be of different colors to make fast and unambiguous optical detection of the three states easier. For example, the first state can be displayed by a red LED, the second state by a yellow LED and the third state by a green LED. A display device of this kind is preferably located on the receiving unit, but alternatively or also additionally the transmission unit can be provided with a display device to display the at least three states.

According to a development of the inventive device, this is formed not only to measure the curing process of a curable material, but moreover to activate at least one system component, for example a system component that influences the course of the curing process. In preferred embodiments of the inventive device, the receiving unit is therefore equipped with at least one relay or another activation element, which is connected to the analysis device and is designed to control a system component depending on at least one of the at least three determined states. For example, an inventive device equipped in such a way can start initiation of the curing process itself by activating a light source for irradiation of the sample material after determination of the second state has taken place. Many other configurations are readily conceivable for an expert using one or more activation elements.

The objects stated at the beginning are also achieved according to the invention by a method for measuring the curing process of a curable material by means of dielectric spectroscopy, which method has the following steps:

injecting a signal in the form of an alternating electric field with a predetermined frequency into a sample of the curable material and determining a first state of decreasing frequency, which corresponds to the sample of the uncured material being applied to a sensor to inject the signal, determining a second state of a substantially constant first frequency, which corresponds to a completed application of the sample of uncured material to the sensor, initiating a curing reaction of the curable material, and determining a third state of a substantially constant second frequency, which corresponds to a desired curing state of the curable material being reached, wherein the constant second frequency is higher than the constant first frequency, and displaying the state determined in each case.

According to the invention, measurement takes place of the frequency of the alternating electric field in the form of oscillation periods or also pulses per fixed unit of time.

To ensure good comparability of different measurements, the inventive method preferably comprises the step of calibrating each sensor to an identical initial value of the frequency of the alternating electric field before application of the sample of uncured material. What is important in this case is not primarily a certain value of the frequency, but rather an identical initial value of all sensors that are to be used to measure the curing process of a certain curable material.

To make it easier to analyze the frequency changes detected and to enable more precise assignment, advantageous configurations of the inventive method comprise measurement of an irradiation period of the sample with UV light. Alternatively or in addition, advantageous configurations of the inventive method comprise measurement of the temperature of the sample during the period of injection of the signal in the form of an alternating electric field into the sample of curable material.

Particularly preferable configurations of the inventive method comprise the step of measuring a frequency change of a sensor configured as a capacitor that is part of a resonant circuit to determine the first, second and third state. The mode of operation of such a sensor was previously already explained in detail in connection with the inventive device and does not therefore need to be repeated here.

The inventive device and the inventive method are suitable in particular for determining the polymerization behavior (time progression) of unknown curable materials in given curing conditions and for comparative interpretation. Furthermore, the inventive device and the inventive method are well suited for determining optimal curing parameters when using different initiation sources (thermal, chemical or light irradiation, in particular by means of UV or IR light of different wavelengths), for determining a thermal stress of the curable material during its curing, for determining a necessary threshold intensity for initiating the curing process and for determining the necessary irradiation dose or quantity of heat to reach complete curing. Finally, the inventive device and the inventive method enable the monitoring of and adherence to parameters that have been defined as suitable for a given curing process. Warning signals, for example, can optionally be emitted if a deviation from the defined parameters that is no longer tolerable occurs. Furthermore, interventions can optionally take place in the process control, for example an extension and/or an increase in the intensity of UV irradiation to reach a desired curing state again after an established parameter deviation.

An exemplary embodiment of an inventive device and an inventive method are explained in greater detail below on the basis of the enclosed schematic figures. These show:

FIG. 1 a spatial representation of an embodiment of an inventive device with a receiving unit and a transmission unit obliquely from the front and above, FIG. 2 a view of the inventive device corresponding to the view from FIG. 1 obliquely from behind and above, FIG. 3a a sensor circuit board from above, FIG. 3b the sensor circuit board from FIG. 3a from below, and FIG. 4 a measuring curve created during a measurement of the curing process of a curable material by means of the inventive device and on which an application of the inventive method is based.

Figure 2:
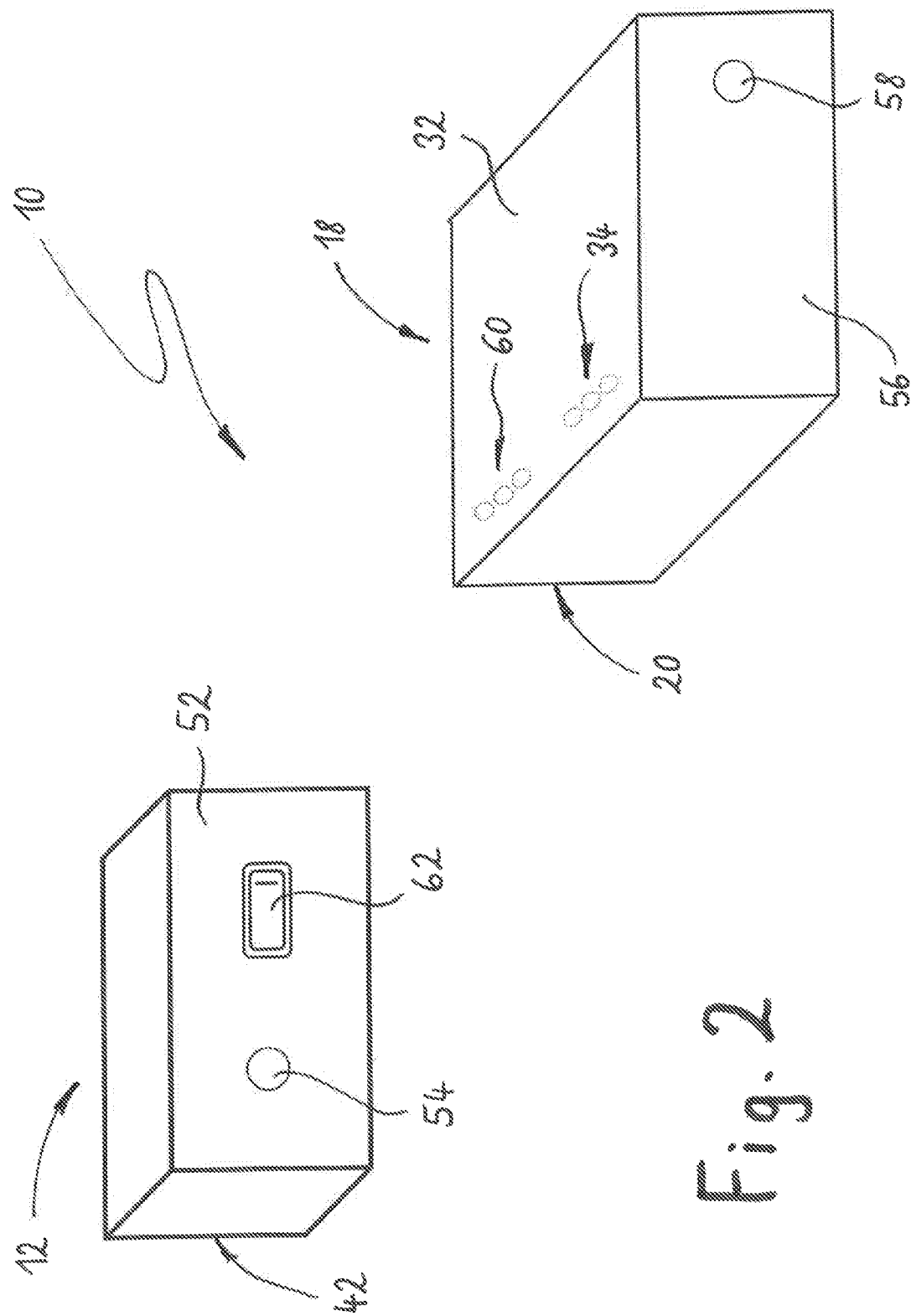

FIGS. 1 and 2 show a device generally designated 10 for measuring the curing process of a curable material by means of dielectric spectroscopy. The device 10 comprises a mobile transmission unit 12 with a sensor 14, which is designed to inject a signal in the form of an alternating electromagnetic field with a predetermined frequency into a sample of the curable material. So that the sensor 14 can inject the alternating electric field into the sample, sample material is applied to a sensor surface 16, which is round here, of the sensor 14.

The device 10 further comprises a receiving unit 18, here with a cuboid housing 20, which unit is physically separate from the transmission unit 12, can communicate wirelessly with the transmission unit 12, and contains in the housing 20 an analysis device 22 indicated by dashed lines (only shown in FIG. 1), which detects frequency changes occurring in the course of a measurement process.

Arranged on a front side 24 of the housing 20 are a power supply connection 26, a control connection 28 and a data communication connection 30. All connections 26, 28, 30 are depicted purely symbolically. For example, the data communication connection 30 can be designed as a USB port, so that the receiving unit 18 can be connected by means of a USB cable (not depicted) to a monitor and/or computer (not depicted). The power supply connection 26 can be implemented as a socket for receiving a power cable of a power unit, not depicted. The control connection 28 can be a socket into which a control cable (not depicted) fits, which connects the receiving unit 18 to a system component to be controlled.

The receiving unit 18 has on an upper side 32 of the housing 20 a display device 34, which consists in the exemplary embodiment shown of three LEDs 36, 38 and 40 and the function of which will be explained in greater detail later.

The mobile transmission unit 12 consists of a likewise cuboid housing 42 here and a sensor circuit board 44, which is rectangular here and carries the sensor 14 with its sensor surface 16 and which in the exemplary embodiment shown is designed as a printed circuit board and can be inserted into a slot 48 formed on the front side 46 of the housing 42. Arranged centrally above the slot 48 on the front side 46 of the housing 42 is a UV sensor 50, which can detect UV light that reaches the sensor surface 16 and thus sample material located on the sensor surface 16.

To be able to operate the transmission unit 12 independently of mains power, located in the housing 42 of the transmission unit 12 is a rechargeable battery (not shown), which supplies the power required for operating the transmission unit 12. The rechargeable battery can be a lithium-ion battery, for example, or also one or more so-called supercaps. To be able to charge the battery located in the housing 42, a charging connection socket 54 is provided on the rear side 52 of the housing 42 (see FIG. 2), which socket can be connected by way of a suitable connection cable (not shown) to a charging socket 58 provided on the rear side 56 of the housing 20 of the receiving unit 18. When the transmission unit 12 is connected to the receiving unit 18 using the sockets 54 and 58 to charge the battery of the transmission unit 12, the charge state of the battery can be monitored by means of a three-stage charge state display 60 here, which is present on the upper side 32 of the housing 20 of the receiving unit 18. In addition, an identically or similarly implemented charge state display can also be present on the housing 42 of the transmission unit 12 (not depicted), so as to be able to check the charge state of the battery of the transmission unit 12 even in a state in which the transmission unit 12 is not connected to the receiving unit 18 for charging.

Also located on the rear side 52 of the housing 42 is a switch 62, which is used to turn the transmission unit 12 on and off.

Figure 3A:
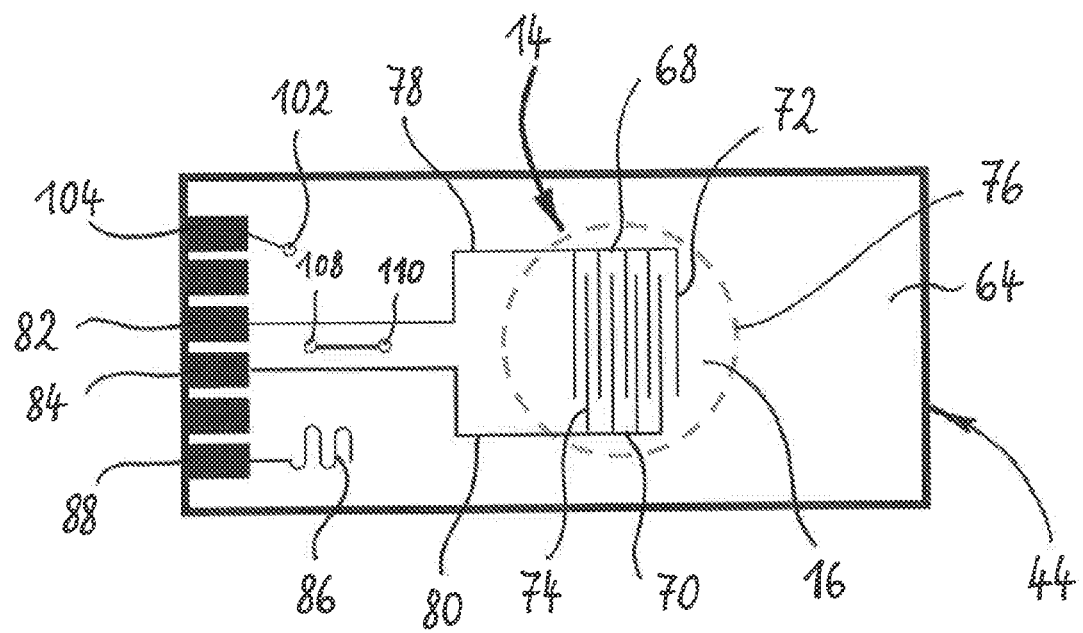

The sensor circuit board 44 is now described in greater detail with reference to FIGS. 3a and 3b, wherein FIG. 3a shows an upper side 64 and FIG. 3b a lower or rear side 66 of the sensor circuit board 44.

As is evident from FIG. 3a, located on the upper side 64 of the sensor circuit board 44 are two comb electrodes 68 and 70 formed from printed electrical conductors, which are arranged engaging in one another so that their teeth 72 and 74 alternately follow one another with a small spacing between one another. The two comb electrodes 68, 70 are represented purely symbolically in FIG. 3a and in reality completely fill the sensor surface 16. The form and arrangement of the comb electrodes 68, 70 is thus definitive for the sensor surface 16, which is round here and the outer edge 76 of which is positioned so that the comb electrodes 68, 70 are located precisely within the sensor surface 16. Each comb electrode 68, 70 is connected by way of a conductor 78, 80 to an electric contact field 82, 84 in each case on the upper side 64, which field is formed on the left-hand short side of the sensor circuit board 44 in FIG. 3a.

Also located on the upper side 64 of the sensor circuit board 44 is an aerial 86, which is implemented as a meander-shaped electrical conductor and connected to an electric contact field 88. The aerial 86 is used for wireless communication between the transmission unit 12 and the receiving unit 18.

Figure 3B:
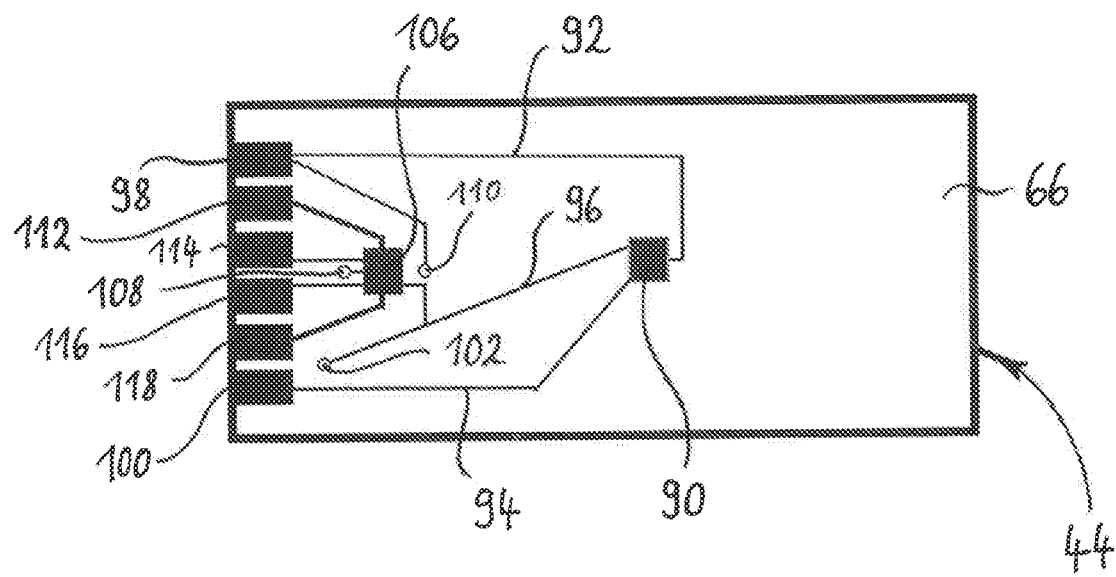

On the lower side 66, depicted in FIG. 3b, of the sensor circuit board 44, a temperature sensor 90 is located in a region of the sensor circuit board overlaid by the sensor surface 16 and is in contact via conductors 92, 94 and 96 with electric contact fields 98, 100 on the lower side 66 and with an electric contact field 104 on the upper side 64 of the sensor circuit board 44 by way of a through contact or via 102. The temperature sensor 90 can be a thermistor of the type Pt100, for example, and serves to measure the temperature of the sample material during the measurement of a curing process of a curable material located on the sensor surface 16 as a sample.

Also arranged on the lower side 66 of the sensor circuit board 44 is an integrated circuit 106, which is connected electrically conductively via conductors to the contact field 98 (by way of two vias 108 and 110) and to other contact fields 112, 114, 116 and 118 and serves inter alia to calibrate the predetermined frequency that the sensor 14 is to inject in the form of an alternating electromagnetic field into a sample material located on the sensor surface 16. It can thus be guaranteed by means of the integrated circuit 106 that each sensor circuit board 44 injects a desired identical predetermined frequency into a sample, so that a plurality of measurements carried out using different sensor circuit boards 44 are comparable with one another. The sensor circuit board 44 can be switched on and off via the contact fields 112 and 118. The integrated circuit board 106 can also be used to identify each sensor circuit board 44 without risk of confusion, for example by means of an identification code contained in the integrated circuit 106 or programmed into it.

The previously described electric contact fields on the upper side 64 and lower side 66 of the sensor circuit board 44 serve to produce an electrically conductive connection between the sensor circuit board 44 and the transmission unit 12 when the sensor circuit board 44 is plugged into the housing 42 through the slot 48. Located in the housing 42 are corresponding mating contacts, not shown here, which interact with the contact fields of the sensor circuit board when the sensor circuit board 44 is in the plugged-in state.

The sensor circuit board 44, which is implemented as described as a printed circuit board, can be provided for single use and is then disposed of after carrying out a measurement. It is also possible to reuse a sensor circuit board 44 that has been used once, but it must then be ensured that a sample material applied to the sensor surface 16 can be detached from the sensor surface 16 again without damaging the sensor circuit board 44. This can be achieved, for example, by suitable coating of the sensor surface 16, which either prevents irrevocable adhesion of the sample material applied or is so hard that applied sample material can be scratched off again without damaging the underlying sensor 14.

In the embodiment described here, the sensor 14 defined by the two cooperative comb electrodes 68, 70 forms a capacitor of an electric resonant circuit, the frequency change of which is detected by the analysis device 22 during the measurement process. The sensor 14 is part of a freely oscillating oscillator circuit here and constitutes the frequency-determining element of the freely oscillating oscillator circuit. The metrological detection of the frequency changes that occur when a curable material to be examined is placed on the sensor surface 16 and then subjected to a curing process is accomplished in the exemplary embodiment shown by means of an ultrafast comparator circuit (not shown), which is known in itself and is located in the transmission unit 12.

The execution of a measurement of the curing process of a curable material is described in greater detail below with reference to FIG. 4, which shows a measuring curve M such as occurs during a measurement of the curing process of a curable material carried out by means of the device 10. In the diagram according to FIG. 4, the number of oscillation periods per unit of time, described as counts, of said resonant circuit is plotted over the time sequence of the measurement. A measurement begins at time to with an empty sensor 14, i.e., no sample to be examined is located on the sensor surface 16. The number of counts detected by the analysis device 22 has a value $c_1$ at the beginning, which corresponds to the predetermined frequency of the alternating electromagnetic field present at the sensor 14. This predetermined frequency is dependent on the curable material to be examined and the desired penetration depth of the alternating electromagnetic field into the sample material and can be approx. 9 MHz, for example.

A sample of the curable material to be examined is then applied to the sensor surface 16. To prevent the applied sample material from spreading beyond the sensor surface 16, the outer edge 76 of the sensor surface 16 can be formed slightly raised. Application of the normally liquid or paste-like sample material to the sensor surface 16 leads to an increase in the dielectric constant of the sensor 14 acting as a capacitor and thus an increase in its capacitance, which in turn brings a fall in the frequency of the resonant circuit. The number of counts detected by the analysis device 22 therefore decreases. In the analysis device 22, two count values $c_2$ and $c_3$ are determined, to which $c_3 < c_2 < c_1$ applies. It is important here that the value $c_2$ is sufficiently smaller than the value $c_1$ and that the interval between $c_2$ and $c_3$ is large enough to be able clearly to detect a frequency drop caused by the sample material application. The interval determined along the measuring curve by the values $c_2$ and $c_3$ corresponds here to a first state of falling frequency, which corresponds to application of the sample material to the sensor 14. Reaching or passing through this first state is displayed by the display device 34 by illumination of the LED 36, which is a red LED in the exemplary embodiment shown.

In the course of further application of the sample material to the sensor surface 16, the count value detected by the analysis device 22 falls further until a material-specific layer thickness of the sample material has resulted on the sensor surface 16, after which a further application of sample material no longer leads to a further drop in the count value, as each predetermined frequency can only penetrate up to a certain depth into a sample. Since the interval defined by the values $c_2$ and $c_3$ has been exited downwards in the course of further application of the sample material, the red LED 36 is no longer illuminated.

When sufficient sample material has been applied to the sensor surface 16, a second state of a substantially constant first frequency occurs, which corresponds to a completed application of the sample to the sensor 14. In the diagram according to FIG. 4, this second state is defined by an interval, which is determined by the count values $c_4$ and $c_5$, wherein $c_5 < c_4$ applies. The values $c_4$ and $c_5$ are determined here such that the substantially constant first frequency, which corresponds to a related count value, is located between the values $c_4$ and $c_5$. As soon as the count value detected by the analysis device 22 falls below the value $c_4$, this is classed as reaching the second state and signaled by illumination of the LED 38, which is a yellow LED in the exemplary embodiment shown. As FIG. 4 shows, the measuring curve now runs initially substantially horizontally, i.e., a stationary state is reached, which characterizes the completed application and distribution of the sample material on the sensor surface 16.

Now the curing process can be initiated. According to the curve reproduced in FIG. 4, this takes place at a time $t_1$, for example by irradiation of the sensor surface 16 bearing the sample material with UV light. At the beginning of the curing process, on account of the temperature increase produced by the incipient polymerization of the sample material, it can occur that the count value detected by the analysis device 22 still falls slightly (see FIG. 4), because the sample material becomes somewhat more liquid due to the temperature increase and the dipole mobility in the sample material still increases temporarily. The value $c_5$ co-defining the second state is selected here so that the lowest count value occurring following initiation of the curing process is still located above the value $c_5$ and thus within the interval defined by the values $c_4$ and $c_5$. If a temperature increase of the sample material occurring due to the incipient polymerization should become too great, for example due to irradiation with UV light that is too intensive or too long (or generally expressed, due to too hard an initiation of the curing process), the value would fall below $c_5$ and this would signal that overheating of the sample material has taken place, which has potentially damaged the sample material irreversibly. Measurement of the time progression is then terminated, which can be displayed by flashing of the yellow LED 38, for example.

Provided that proper initiation of the curing process has taken place, after any passage through the previously explained local minimum, the measuring curve rises again and once more passes the value $c_4$, but from below to above this time. In the moment in which the count value detected by the analysis device 22 passes the value $c_4$ in the direction of rising count values, the previously illuminated yellow LED 38 goes out and at this time $t_2$ an internal timer (not shown) is started, which is used to determine a later time control interval defined by times $t_3$ and $t_4$ in which a desired curing state should have been reached.

Figure 4:
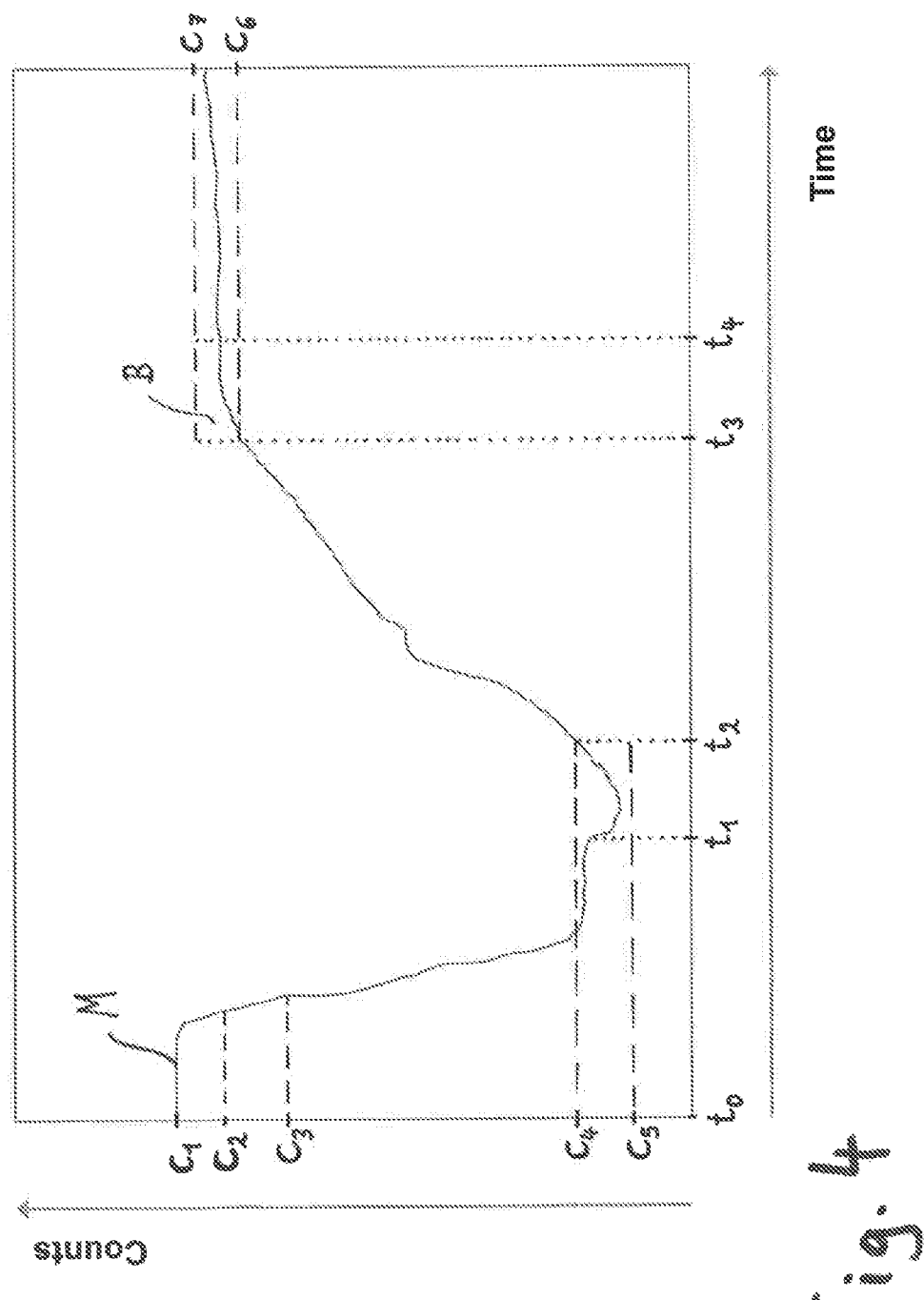

As is evident from FIG. 4, the count value detected by the analysis device 22 rises more or less continuously due to the progressive curing (polymerization) of the sample material until a third state of a substantially constant second frequency is reached, which corresponds to a desired curing state of the curable material. This third state is determined by count values $c_6$ and $c_7$, wherein $c_6<c_7$ applies and wherein $c_7<c_1$ usually also applies. The substantially constant second frequency corresponds here to a related count value, which is located between $c_6$ and $c_7$. As already stated, this third state is advantageously defined not only by the count values $c_6$ and $c_7$, but moreover by the time values $t_3$ and $t_4$, so that for the third state, the control window B depicted in FIG. 4 results, which is delimited by the count values $c_6$ and $c_7$ and the time values $t_3$ and $t_4$ and the attainment of which characterizes a completed curing process with a defined curing quality. Reaching the third state is signaled by illumination of the LED 40, which is a green LED in the present exemplary embodiment.

The described sequence of measurement of the curing process of a curable material gives rise to a number of advantages. For example, initiation of the curing process can be triggered automatically by way of the control connection 28 (by corresponding activation of the UV light source, for example) as soon as the value falls below c4 for the first time. A prerequisite for this is that the value $c_4$ is located only slightly above the count value that corresponds to the second state of a substantially constant first frequency. It is possible, furthermore, then to terminate an energy supply (heat supply, irradiation, etc.) automatically as soon as the value $c_6$ has been reached from below. This option naturally only applies to systems in which an energy supply takes place not only for the purpose of initiating the curing process, but also during the curing process. It would also be possible to trigger post-exposure on reaching time $t_3$ if the value $c_6$ should not have been reached by this time.

Another advantage of the sequence described consists in it being the curing progression (polymerization progression) itself that leads to the start of the internal timer. This start is thus independent of preceding time delays, which can occur due to the process of dosing the sample material onto the sensor surface 16, for example.

The invention claimed is:

1. A device for measuring a curing process of a curable material by dielectric spectroscopy, the device comprising:
   a mobile transmission unit including a sensor configured to contact a sample of the curable material, wherein the sensor is configured to inject a signal in the form of an alternating electric field with a predetermined frequency into the sample, and
   a receiving unit physically separate from the transmission unit and configured to communicate wirelessly with the transmission unit, the receiving unit including an analysis device configured to detect changes in the predetermined frequency that occur in the course of a measurement process,
   wherein
   the sensor is formed on a sensor circuit board configured to be detachably connected to the transmission unit,
   wherein the analysis device is configured to determine, on the basis of frequency changes detected during the measurement process, at least three states; (i) a first state of decreasing frequency corresponding to the sample of the curable material, in an uncured state, being applied to the sensor, (ii) a second state of a substantially constant first frequency corresponding to a completed application of the sample of curable material, in the uncured state, to the sensor, and (iii) a third state of a substantially constant second frequency corresponding to a desired curing state of the curable material being reached, wherein the constant second frequency is higher than the constant first frequency, and wherein
   the receiving unit has a display device for displaying the at least three states, and
   the device is configured to initiate, once determination of the second state has taken place, the curing process of the curable material.

2. The device according to claim 1, wherein the sensor is part of a resonant circuit containing a capacitor, the resonant circuit exhibiting the frequency changes detected during the measurement process.

3. The device according to claim 1, wherein the sensor is a capacitor.

4. The device according to claim 3, wherein the sensor has two cooperative comb electrodes defining a sensor surface.

5. The device according to claim 4, wherein the two cooperative comb electrodes are formed on an upper side of the sensor circuit board.

6. The device according to claim 1, wherein the sensor circuit board has a temperature sensor associated with the sensor, wherein the temperature sensor is located on a rear side of the sensor circuit board.

7. The device according to claim 1, wherein the transmission unit has a UV sensor configured to detect UV irradiation of the sample of the curable material.

8. The device according to claim 1, wherein the display device comprises three LEDs for displaying the at least three states.

9. The device according to claim 1, wherein the receiving unit has at least one relay connected to the analysis device, the at least one relay configured to control a system component depending on at least one of the at least three determined states.

10. A method for measuring a curing process of a curable material by dielectric spectroscopy, the method comprising:
    injecting with a sensor a signal in the form of an alternating electric field with a predetermined frequency into a sample of the curable material,
    determining a first state of decreasing frequency resulting from the sample of the curable material, in an uncured state, being applied to the sensor,
    determining a second state of a substantially constant first frequency-resulting from completed application of the sample of the curable material, in the uncured state, to the sensor,
    initiating, when the second state has been determined, a curing reaction of the curable material,
    determining a third state of a substantially constant second frequency-resulting from a desired curing state of the curable material being reached, wherein the constant second frequency is higher than the constant first frequency, and
    displaying each of the first, second and third states upon a respective determination thereof.

11. The method according to claim 10, further comprising measuring a frequency of the alternating electric field in the form of oscillation periods or pulses per fixed unit of time.

12. The method according to claim 10, wherein the sensor is arranged on a sensor circuit board, the method further comprising, prior to application of the sample of curable material, in the uncured state, to the sensor, calibrating the sensor to an initial value of the predetermined frequency of the alternating electric field such that the sensor of each of a plurality of different sensor circuit boards usable with the method is calibrated to an identical initial value of the frequency of the alternating electric field.

13. The method according to claim 10, further comprising measuring a duration of irradiation of the sample of the curable material with UV light.

14. The method according to claim 10, further comprising measuring the temperature of the sample of the curable material during a duration of the injection of the signal of the alternating electric field into the sample of curable material.

15. The method according to claim 10, wherein the sensor is provided in the form of a capacitor, and the capacitor is part of a resonant circuit, the method further comprising measuring a frequency change of the sensor to determine the first, second and third states.

* * * * *